United States Patent
Liu et al.

(10) Patent No.: US 8,165,189 B2
(45) Date of Patent: Apr. 24, 2012

(54) DIRTY PAPER PRECODING WITH KNOWN INTERFERENCE STRUCTURE AT RECEIVER

(75) Inventors: Hui Liu, Clyde Hill, WA (US); Bin Liu, Bellevue, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 255 days.

(21) Appl. No.: 11/544,273

(22) Filed: Oct. 6, 2006

(65) Prior Publication Data
US 2007/0079742 A1 Apr. 12, 2007

Related U.S. Application Data

(60) Provisional application No. 60/724,941, filed on Oct. 7, 2005.

(51) Int. Cl.
*H04L 27/00* (2006.01)
*H04B 7/00* (2006.01)
*H04B 7/24* (2006.01)
*H04B 1/00* (2006.01)

(52) U.S. Cl. ........ 375/220; 375/316; 375/219; 375/295; 370/310; 370/431; 455/39; 455/68; 455/69

(58) Field of Classification Search .................. 375/219, 375/220, 240.02–240.07, 260–261, 268–269, 375/295–296, 298, 300, 309, 316, 324, 334, 375/354, 356, 358, 362; 370/310, 395.6–395.61, 370/431, 437, 464, 465, 468; 455/39, 68–71, 455/73, 91–92, 115.1, 280–283
See application file for complete search history.

(56) References Cited

U.S. PATENT DOCUMENTS

| | | | | |
|---|---|---|---|---|
| 5,311,547 A | * | 5/1994 | Wei | 375/290 |
| 5,446,758 A | * | 8/1995 | Eyuboglu | 375/259 |
| 5,673,292 A | | 9/1997 | Carlin | |
| 6,680,985 B1 | * | 1/2004 | Strodtbeck et al. | 375/320 |
| 6,965,652 B1 | | 11/2005 | Burd et al. | |
| 7,006,795 B2 | | 2/2006 | Foschini et al. | |

(Continued)

OTHER PUBLICATIONS

Bradley, B., and J. Stach, "New Wrinkle in Dirty Paper Techniques," *Proceedings of SPIE (Int'l Society for Optical Engineering), Security and Watermarking of Multimedia Contents V* 5020:632-643, Santa Clara, California, Jan. 21-24, 2003.

(Continued)

*Primary Examiner* — David C. Payne
*Assistant Examiner* — Linda Wong
(74) *Attorney, Agent, or Firm* — McDonnell Boehnen Hulbert & Berghoff LLP

(57) ABSTRACT

A dirty paper precoding ("DPC") method for broadcasting a signal is disclosed that takes advantage of knowledge of the structure of interference in order to avoid the quantization noise that results in the conventional DPC method. The proposed method modifies the Tomlinson-Harishima precoding ("THP") scheme by selecting a constellation and mapping scheme that is designed based on the known interference modulation structure of the interference signal, which is typically directed to a second receiver. In a particular embodiment, a source signal and an interference signal are QAM modulated. The modulation structure information of the interference signal is known to the receiver. At the transmitter the source signal is precoded based on the known interference structure, and a common mapping rule is implemented, such that the received signal can be decoded at the receiver without requiring a modulo operation at either the transmitter or receiver.

16 Claims, 3 Drawing Sheets

U.S. PATENT DOCUMENTS

| | | | | |
|---|---|---|---|---|
| 7,200,180 | B2 * | 4/2007 | Verbin et al. | 375/261 |
| 7,289,585 | B2 * | 10/2007 | Sandhu et al. | 375/347 |
| 7,542,446 | B2 * | 6/2009 | Mehta et al. | 370/330 |
| 7,565,114 | B2 * | 7/2009 | Ito et al. | 455/69 |
| 7,573,900 | B2 * | 8/2009 | Kim et al. | 370/465 |
| 2003/0185310 | A1 * | 10/2003 | Ketchum et al. | 375/259 |
| 2004/0174937 | A1 | 9/2004 | Ungerboeck | |
| 2005/0058217 | A1 * | 3/2005 | Sandhu et al. | 375/267 |
| 2005/0068884 | A1 * | 3/2005 | Yoon et al. | 370/203 |
| 2005/0085236 | A1 * | 4/2005 | Gerlach et al. | 455/450 |
| 2005/0157805 | A1 * | 7/2005 | Walton et al. | 375/267 |
| 2005/0254592 | A1 * | 11/2005 | Naguib et al. | 375/267 |
| 2005/0276317 | A1 * | 12/2005 | Jeong et al. | 375/213 |
| 2006/0056551 | A1 * | 3/2006 | Lozhkin | 375/348 |
| 2006/0094373 | A1 * | 5/2006 | Hottinen | 455/73 |
| 2009/0252247 | A1 * | 10/2009 | Lee et al. | 375/267 |

OTHER PUBLICATIONS

Caire, G., and S. Shamai (Shitz), "On the Achievable Throughput of a Multiantenna Gaussian Broadcast Channel," *IEEE Transactions on Information Theory* 49(7):1691-1706, 2003.

Costa, M.H.M., "Writing on Dirty Paper," *IEEE Transactions on Information Theory IT-29*(3):439-441, 1983.

Cover, T.M., "An Achievable Rate Region for the Broadcast Channel," *IEEE Transactions on Information Theory IT-21*(4):399-404, 1975.

Cover, T.M., "Broadcast Channels," *IEEE Transactions on Information Theory IT-18*(1):2-14, 1972.

Dick, C.H., and H.M. Pedersen, "Design and Implementation of High-Performance FPGA Signal Processing Datapaths for Software Defined Radios," *Proceedings of Xilinx Media Alert for Embedded Systems Conference*, San Francisco, California, Apr. 9-13, 2001, 16 pages.

El Gamal, A., and E.C. van der Meulen, "A Proof of Marton's Coding Theorem for the Discrete Memoryless Broadcast Channel," *IEEE Transactions on Information Theory IT-27*(1):120-122, 1981.

Erez, U., and S. ten Brink, "A Close-to-Capacity Dirty Paper Coding Scheme," submitted to *IEEE Transactions on Information Theory* on Apr. 4, 2004, Revised Version Sep. 1, 2004, 13 pages.

Erez, U., and S. ten Brink, "Approaching the Dirty Paper Limit for Canceling Known Interference," *Proceedings of the 41st Annual Allerton Conference on Communication, Control, and Computing*, Monticello, Illinois, Oct. 1-3, 2003, 11 pages.

Erez, U., et al., "Capacity and Lattice-Strategies for Cancelling Known Interference," *International Symposium on Information Theory and Its Applications*, Honolulu, Hawaii, Nov. 5-8, 2000, 5 pages.

Harashima, H., and H. Miyakawa, "Matched-Transmission Technique for Channels With Intersymbol Interference," *IEEE Transactions on Communications COM-20*(4):774-780, 1972.

Jindal, N., and A. Goldsmith, "Dirty Paper Coding vs. TDMA for MIMO Broadcast Channels," *Proceedings of IEEE Int'l Conference on Communications* (2):682-686, Paris, France, Jun. 2004.

Peel, C.B., "On Dirty-Paper Coding," *IEEE Signal Processing Magazine*, May 2003, pp. 112-113.

RaviKiran, G., "Dirty Paper Writing and Watermarking Applications," Feb. 10, 2003, 8 pages.

van der Meulen, E.C., "Random Coding Theorems for the General Discrete Memoryless Broadcast Channel," *IEEE Transactions on Information Theory IT-21*(2):180-190, 1975.

Vishwanath, S., et al., "Duality, Achievable Rates, and Sum-Rate Capacity of Gaussian MIMO Broadcast Channels," *IEEE Transactions on Information Theory 49*(10):2658-2668, 2003.

Yu, W., and J.M. Cioffi, "Sum Capacity of Gaussian Vector Broadcast Channels," *IEEE Transactions on Information Theory 50*(9):1875-1892, 2004.

Yu, W., et al., "Writing on Colored Paper," Mar. 2, 2002, pp. 1-22.

Zamir, R., et al., "Nested Linear/Lattice Codes for Structured Multiterminal.Binning," *IEEE Transactions on Information Theory 48*(6):1250-1276, 2002.

* cited by examiner

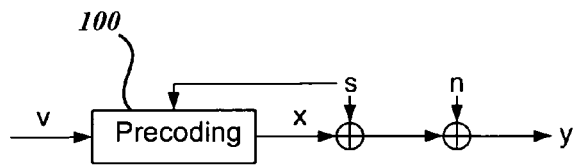
Fig.1.
PRIOR ART
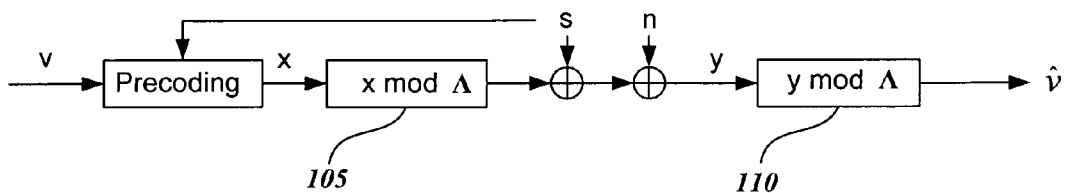
Fig.2.
PRIOR ART
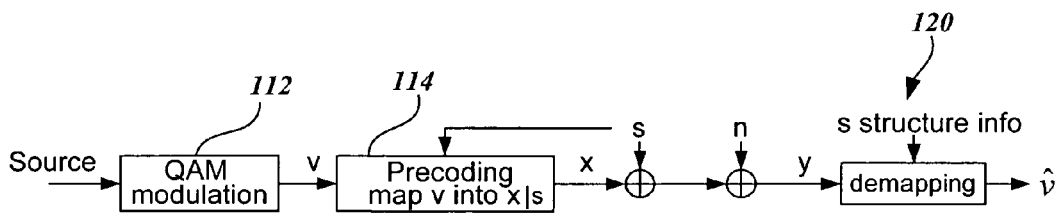
Fig.3.
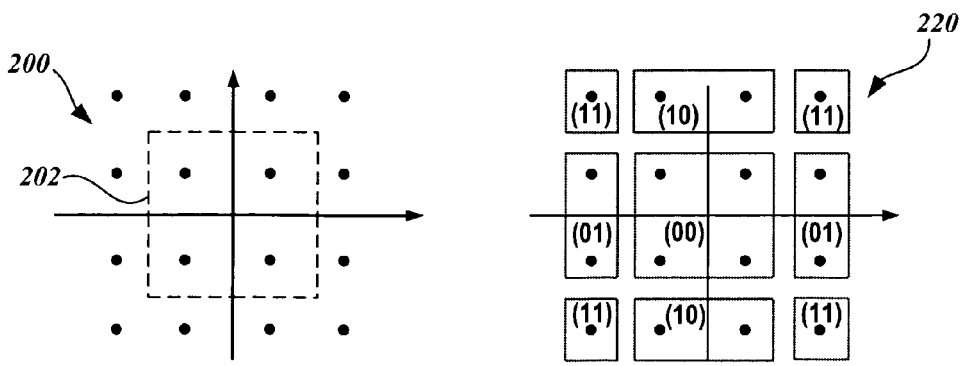
Fig.4A.
PRIOR ART
Fig.4B.

DIRTY PAPER PRECODING WITH KNOWN INTERFERENCE STRUCTURE AT RECEIVER

CROSS-REFERENCE TO RELATED APPLICATION

This application claims the benefit of U.S. Provisional Application No. 60/724,941, filed Oct. 7, 2005, the disclosure of which is hereby expressly incorporated by reference in its entirety, and priority from the filing date of which is hereby claimed under 35 U.S.C. §119.

STATEMENT OF GOVERNMENT LICENSE RIGHTS

This invention was made with government support under 0086032 awarded by National Science Foundation. The government has certain rights in the invention.

BACKGROUND

Broadcast is a communication scenario or modality where a single transmitter sends independent information to multiple non-cooperating receivers. The broadcast channel was introduced by T. Cover in "Broadcast Channels", *IEEE Trans. Inform Theory*, 1972, where an achievable capacity region of the degraded channel is derived by means of superposition coding. T. Cover, "An Achievable Rate Region for the Broadcast Channel," *IEEE Trans. Inform. Theory*, 1975, and E. van der Meulen, "Random Coding Theorems for the General Discrete Memoryless Broadcast Channel," *IEEE Trans. Inform. Theory*, 1975, disclose an inner bound for degraded discrete memoryless broadcast channels. Marton presented an inner bound of a class of nondegraded broadcast channel in "A Coding Theorem for the Discrete Memoryless Broadcast Channel," *IEEE Trans. Inform. Theory*, 1979.

Recently the capacity region of multiple-input multiple-output ("MIMO") Gaussian broadcast channel has been studied intensively due to its applicability and benefits in wireless communications applications. The sum capacity of the multi-user MIMO broadcast channel is well studied, see for example, G. Caire and S. Shamai, "On the Achievable Throughput of a Multiantenna Gaussian Broadcast Channel," *IEEE Trans. Inform. Theory*, vol. 49, no. 7, pp. 1691-1706, July 2003; Wei Yu and I. M. Cioffi, "Sum Capacity of Gaussian Vector Broadcast Channels," *IEEE Trans. Inform. Theory*, vol 50, no. 9, pp. 1875-1892, September 2004; and S. Vishvanath, N. Jindal and A. Goldsmith, "Duality, Achievable Rates, and Sum-Rate Capacity of Gaussian Mimo Broadcast Channels," *IEEE Trans. Inform. Theory*, vol 49, no. 10, pp 2658-2668, October 2003. Dirty paper coding ("DPC") is a key technology discussed in these papers to derive the sum capacity of the MIMO Gaussian broadcast channel.

A well-known practical DPC approach, known in the art as Tomlinson-Harashima precoding ("THP"), is described in H. Harashima and H. Miyakawa, "Matched-Transmission Technique for Channels with Intersymbol Interference," *IEEE Trans. Commun.*, vol. 20, pp. 774-780, August 1972; and, M. Tomlinson, "New Automatic Equaliser Employing Modulo Arithmetic," *Electronics Letters*, vol. 7, pp. 138-139, March 1971. THP was originally developed for intersymbol interference ("ISI") channels. Its simple structure makes THP a very attractive solution for DPC implementation. U. Erez, S. Shamai(Shitz), and R. Zamir. "Capacity and Lattice-Strategies for Cancelling Known Interference." *In Proceedings of ISITA* 2000, Honolulu, Hi., pp. 681-684, Nov. 2000. However THP suffers a 1.53 dB capacity loss in the scalar case due to shaping, although the capacity gap can be eliminated by using vector lattice coding with much higher complexity.

Since THP is a nonlinear operation, it inevitably causes some quantization noise. The inventors herein have developed a method to reduce the effect of the quantization noise introduced by nonlinear coding. Towards this end, we observe that in some applications, the interference may be of a particular modulation structure that is known to the receiver. This is often the case, for example, in wireless applications where the interference is a known, modulated signal. For example, we disclose a method that reduces the performance loss by taking advantage of the known modulation structure information of the interference signal.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Although dirty paper coding is a known method for improving the performance of wireless broadcast telecommunications, and is suitable for broadcasting independent signals to multiple receivers, the method is known to incur significant losses, including losses that are attributable to the use of the modulo function in prior art implementations. Disclosed herein is a novel method for implementing DPC that takes advantage of prior knowledge of the interference signal to eliminate or reduce losses associated with DPC.

A method is disclosed for precoding a signal to be transmitted from a transmitter to a receiver in a broadcast system. A source signal representing information to be transmitted from the transmitter to the first receiver is generated. The modulation structure, or aspects of the modulation structure, is determined for a second signal transmitted to a second receiver, the second signal being an interference to the source signal. A first constellation for decoding a signal received by the first receiver is selected based on the interference signal modulation structure, and a mapping rule for mapping the received signal is determined. The source signal is then precoded according to the mapping rule.

The source signal and/or the interference signal may be generated, for example, using quadrature amplitude modulation, or with a higher order modulation method.

In a particular embodiment the source signal is a low-resolution multimedia signal, and the interference signal is a high-resolution multimedia signal for the same multimedia content, so that the transmitter can transmit content at various resolutions, to suit different receivers having different capabilities.

The preceding may be demapped onto its constellation without using a modulo operation, such that quantization noise is eliminated.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a diagram generally illustrating the scalar case dirty paper coding scheme scenario;

FIG. 2 is a diagram generally illustrating the dirty paper coding implementation with THP;

FIG. 3 shows a dirty paper coding implementation in accordance with the present invention, wherein the structure of the interference is known;

FIG. 4A shows the effective constellation in a typical THP scheme;

FIG. 4B shows an exemplary constellation suitable for use with the present invention, wherein two signals are transmitted using QPSK modulation;

DETAILED DESCRIPTION

I. System Model

1.1 Dirty Paper Coding

Figure 5:
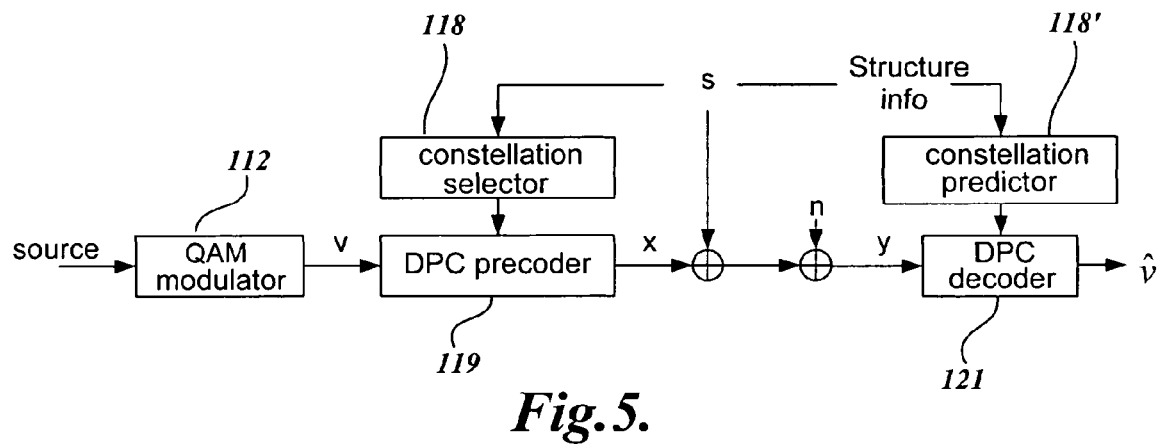
FIG. 5 is a diagram showing a transceiver structure for applying the present method for higher order constellations.

Consider the scalar case dirty paper coding illustrated in FIG. 1, described in detail in M. Costa, "Writing on Dirty Paper," *IEEE Trans. Inform. Theory*, vol. IT-29, no. 3, May 1983, and is hereby incorporated by reference. The output of the precoder 100 is given as $x = v - \alpha s$, where v is the input signal, s denotes the known interference, and $\alpha$ is a scalar multiplier. To maximize the mutual information between y and v, given the signal power, $P_x$, and noise power $P_n$, we let $$\alpha = \frac{P_x}{P_x + P_n}$$

and obtain the channel capacity as $$C = \frac{1}{2}\log\left(1 + \frac{P_x}{P_n}\right).$$

1.2 Implementation of Dirty Paper Coding

Let $\Lambda$ denote an n-dimensional lattice and let V denote its fundamental Voronoi region. Also let u~unif(V), that is, u is a random variable (dither) uniformly distributed over V. The dirty paper coding scheme may be implemented as follows, Transmitter: The input alphabet is restricted to V. For any $v \subset V$, the precoder sends:

$x = (v - \alpha s - u) \bmod \Lambda.$

Receiver: The receiver computes:

$\hat{v} = (\alpha y + u) \bmod \Lambda,$ where u is the common dither shared by the receiver and the transmitter and is uniformly districutred over $(-(\Lambda/2), (\Lambda/2))$. The dithering ensures that the channel input x has a uniform distribution. The quantizer level $\Lambda$ is chosen to meet the power constrains without causing any ambiguity in v. From the expression of v, is clear that quantizatiokn introduces extra noise in demodulation. Hence, the capacity is strictly less than the capacity of the corresponding DPC channel. In U. Erez, S. T. Brin, *Approaching the Dirty Paper Limit for Canceling Known Interference*, 41st Ann. Allerton Conf. on Commun., Control, and Computing, Oct. 1-3, 2003, MMSE scaling is introduced to improve the THP performance. In Shamai and Laroia, *The Intersymbol Interference Channel: Lower Bounds on Capacity and Channel Precoding Loss*, IEEE Trans. Inf. Theory, vol. 42, no. 9, pp. 1388-1404, September 1996, the authors break down the THP losses into a shaping loss, a modulo loss and a power loss. Specifically, the shaping loss is 1.53 dB in the high SNR regime while the modulo loss (up to 3-4 dB) and power loss dominate the low SNR regime.

For the scalar case, the problem can be viewed from another angle. Following the DPC method described above, let $\alpha = 1$ in high SNR regions. The interference is therefore subtracted directly in precoding. While doing this, a modulo operator 105 is needed to sustain the power constraint in the transmitter side, which means $\|x\|^2 \leq P$. This is a THP precoding, and is illustrated generally in FIG. 2. At the receiver side, another modulo process 110 is performed to recover the transmitted data. The quantizer $\Lambda$ is chosen to meet the power constraints without causing any ambiguity in v.

From FIG. 2, it can be shown that:

$$y = x + s + n = (v - s) \bmod \Lambda + s + n$$
$$= v + n - m\Lambda$$

where m is an integer. Then we have:

$\hat{v} = y \bmod \Lambda = (v+n) \bmod \Lambda.$

It is clear that quantization introduces extra noise in demodulation. In the scalar case, the gap to the capacity is known to be 3-4 dB in low SNR regions. Now let us investigate whether it is possible to improve the performance without increasing complexity.

In a broadcast channel scenario for the two-user case (i.e., user A and user B) the transmitted signal for user B is seen as interference to user A. A diagram illustrating the present method implemented for an exemplary transceiver in the two-user broadcast scenario is shown in FIG. 3, where v is the signal for user A, while the interference, s, is actually the transmitted signal for user B. In many applications, the modulation schemes of each user are commonly broadcast on a public channel, and therefore each user knows, or can know, the modulation schemes of the other user(s). It will be appreciated that the source signal and the interference signal may be transmitted by the same transmitter, or may be transmitted by different transmitters, that may be in unrelated broadcast systems. We disclose herein an approach that reduces, or even eliminates in some cases, the performance loss (e.g., 3-4 dB in the scalar case) by taking advantage of the known power and/or modulation structure information of the interfering signal, s, in the low SNR regime.

II. Precoding with Interference Structure Known at Receiver

As discussed above, the conventional THP precoding introduces quantization noise. Of course, it is desirable to reduce or eliminate such noise.

In FIG. 3, the modulation structure information of the interference, s, is known to the receiver 120. It will be appreciate by persons familiar with the art that a variety of modulation structures that may be implemented, including fore example quadrature amplitude modulation ("QAM"), non-rectangular QAM, phase modulation, amplitude modulation, and the like. For simplicity, we consider a system using quadrature amplitude modulation 112, and wherein the source signal is precoded to account for a known interference modulation structure and the receiver 120 has prior knowledge of the constellation of the received signal, y. Of course, the method described herein may be readily implemented using other modulation structures in a straightforward manner, using the teaching of the present disclosure. As described herein, using the present method we can de-map y onto its constellation without performing the modulo operation required in THP. In the meantime, the soft information can also be extracted, and used as the input to a successive soft channel decoder. The new scheme is explained with a two-user example below.

2.1. Example 1

Two Users with QPSK Constellation

Consider, for example, the two-user case. Assume for this example that both users are quadrature phase shift keying modulated ("QPSK"). For the regular THP case shown in FIG. 2, the decoded signal is $\hat{v}=(v+n) \bmod \Lambda$. The constellation of y 200 is shown in FIG. 4A. The points inside the dashed box 202 are the effective constellation of v.

Of course, the precoding output must meet the transmitter power constraint. In other words, the output x of the precoder 114 (FIG. 3) must have the same average power as the source v.

In this example, the scheme is carried out in the following steps:
1. Precoding:

$$\begin{cases} x = v - s; & |v| > |s|; \\ x = \text{sign}(s)(|2i \cdot v - |v||) - s; & i = \left\lfloor \frac{1}{2}\left(\frac{|s|}{|v|} + 1\right)\right\rfloor; |v| \leq |s|. \end{cases}$$

where $\lfloor \bullet \rfloor$ indicates the floor operator.

The precoding rule is applied to both dimensions of the QPSK signal. The power of x is the average power of random signal: $\pm[2(i-1)\cdot|v|-|s|]$ and $\pm[2(i+1)|v|-|s|]$, which are bounded.

2. Decoding: The decoder detects the 2-bit symbol based on the location of the received signal (relative to four decision regions). For $|v|>|s|$, the decision region is the same as the QPSK. For $|v|<=|s|$, unlike regular QPSK, the four decision regions are asymmetric as illustrated on the constellation 120 shown in FIG. 4B. Nevertheless, a direct mapping from the source v to y can be established. By removing the modulo operation, the noise folded into the modulo interval around the origin is eliminated.

It will be appreciated that with the structure information of the interference, s, the receiver shares the knowledge of y's constellation with the transmitter. In this case, y has 16-QAM like constellation. However, the mapping from v to y has several possible choices. It is easily verified that the mapping shown in FIG. 4B yields the best performance in the present example.

2.2 Example 2

Two Users with High Order Constellation

Refer now to FIG. 5, which shows diagrammatically the present method applied utilizing a higher order constellation, still assuming for purposes of illustration, a system using QAM. The disclosed precoding strategy can be readily extended to higher order modulation scenarios. It should be appreciated that the constellation of y may vary with the strength of the interference (or the signal of another user). However if the signal strength of the interferer signal is within a certain range, the constellation of y remains unchanged.

Generally speaking, the design of the new precoding scheme involves two steps:
1. Selecting the Constellation of y, Subject to the Following Constraints:
   (a) In order to meet the power constraints at the transmitter, the constellation of y must be designed properly according to the modulation structure and/or strength of the interference. A common rule must be in place, so that both receiver and transmitter will expect the same constellation for y.
   (b) According to the constellation of y, a proper mapping rule should be set from v to y so that the best performance is achieved.
2. Precoding Strategy at Transmitter.
   Once the constellation of y is chosen, we need to design a precoder according to the mapping rule and the interference, the modulation structure of which is fully known at the transmitter. Also we should keep in mind that the transmitter signal must satisfy the transmitter power constraint.

At the receiver, the source information is demodulated directly from y, without using a modulo function. Note that the above processes at the transmitter and the receiver are independent.

2.3 Example 3

Source QPSK Modulated Interference 16-QAM Modulated

Figure 6:
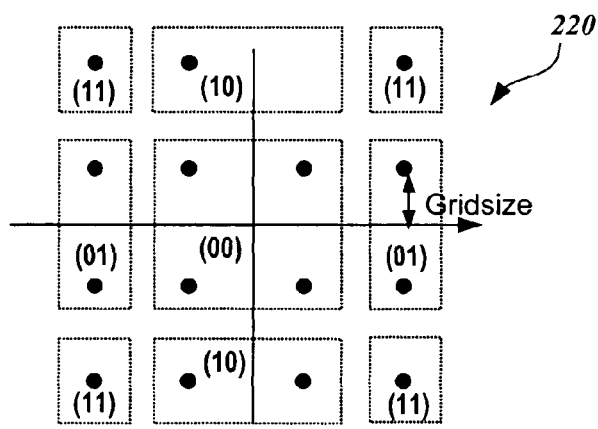
FIG. 6 is a constellation diagram similar to FIG. 4B, and indicating the gridsize parameter.

In this example, the source is QPSK modulated while the interference 16-QAM modulated. Assuming the average signal strength of the interference, s, is 1.5 times the average signal strength of the source, v, that is $|s|=1.5|v|$, we select the constellation of y as indicated in FIG. 6, which shows the same constellation shown in FIG. 4B, with the definition for gridsize indicated.

Then at the precoder a precoding strategy is selected for the source, v, to achieve the selected constellation of y. The mapping rule from source v to x is shown in the Table 1, using the definition of gridsize shown in FIG. 6.

TABLE 1

| | mapping rule from source v to x |
|---|---|
| v is (0,0) | If real(s)>0, then real(x)=gridsize−real(s);<br>else real(x)=−gridsize−real(s);<br>If imag(s)>0, then imag(x)=gridsize−imag(s);<br>else imag(x)=−gridsize−imag(s); |
| v is (0,1) | If real(s)>0, then real(x)=3×gridsize−real(s);<br>else real(x)=−3×gridsize−real(s);<br>If imag(s)>0, then imag(x)=gridsize−imag(s);<br>else imag(x)=−gridsize−imag(s); |
| v is (1,0) | If real(s)>0, then real(x)=gridsize−real(s);<br>else real(x)=−gridsize−real(s);<br>If imag(s)>0, then imag(x)=3×gridsize−imag(s);<br>else imag(x)=−3×gridsize−imag(s); |
| v is (1,1) | If real(s)>0, then real(x)=3×gridsize−real(s);<br>else real(x)=−3×gridsize−real(s);<br>If imag(s)>0, then imag(x)=3×gridsize−imag(s);<br>else imag(x)=−3×gridsize−imag(s); |

As noted above, the constellation of y may vary with the strength of the interference. It will be readily apparent to persons of skill in the art that the precoding and decoding approach can be easily modified for each possible constellation of y accordingly.

If both the source and the interference constellations are 16-QAM or even higher order, it may not be practical to do such precoding at the transmitter due to complexity issues. If the complexity is overly burdensome, the regular THP precoding may be conducted at the transmitter, while the modified decoding strategy is still applicable at the receiver.

2.4 Example 4

More than Two-User Case

For the case involving more than two users, things become a little more complicated. The receiver needs to know the structure and strength of the other two (or more) users. However once this information is determined, the receiver still can predict the constellation of y. The precoding and decoding procedures are still the same as the two-user case.

2.5 Example 5

Hierarchical Modulation for Multi-Rate Multimedia Delivery

In digital TV or other wireless/wireline broadcasting applications, different users usually experience different channel qualities/signal strengths due to their geographical locations. Ideally, users with high signal strength should receive higher qualities programs (e.g., high-definition TV—HDTV) over those with lower signal strength and therefore only the basic program. Such can be achieved through the combination of source coding and hierarchical modulation. A multi-rate source code is a data compression algorithm designed specifically for the multi-user communication system. The simplest example of a multi-rate source code is the multi-resolution code—in which a single transmitter describes the same information to a family of receivers so that all receivers receive the lowest-rate description (the first data stream), and each higher rate is achieved by adding on to the description at the nearest lower rate (the second data stream, etc.).

Hierarchical modulation can be employed to transmit the first and the second or/and more data streams. The most commonly used hierarchical modulation scheme is the hierarchical QAM, where QPSK carrying the first data stream (e.g., lowest-rate description) is combined with higher dimensional QAM (e.g., 16-QAM) carrying the second data stream (e.g., the next level of description) or an additional source. For practical applications, the first modulation enables the basic program with relatively lower data rate, and the higher dimensional QAM enables additional information for higher quality programs or more channels.

While hierarchical QAM is relatively simple to implement, it does suffer from some performance loss relative to regular QAM. Existing techniques such as success cancellation can be used to recover some of the loss in hierarchical QAM. However the cost burden incurred at the receiving end is often prohibitive in practice.

The present method can be implemented to provide a new hierarchical modulation scheme for multi-rate multimedia delivery based on the DPC technique. The major advantages of the new technique over prior art include:

1. Significantly simplified receiver structure—different data streams can be decoded independently.

2. No additional requirements on data memory—since different data streams are decoded independently, no excess data memory is needed as in the case of joint decoding/success demodulation.

Figure 7:
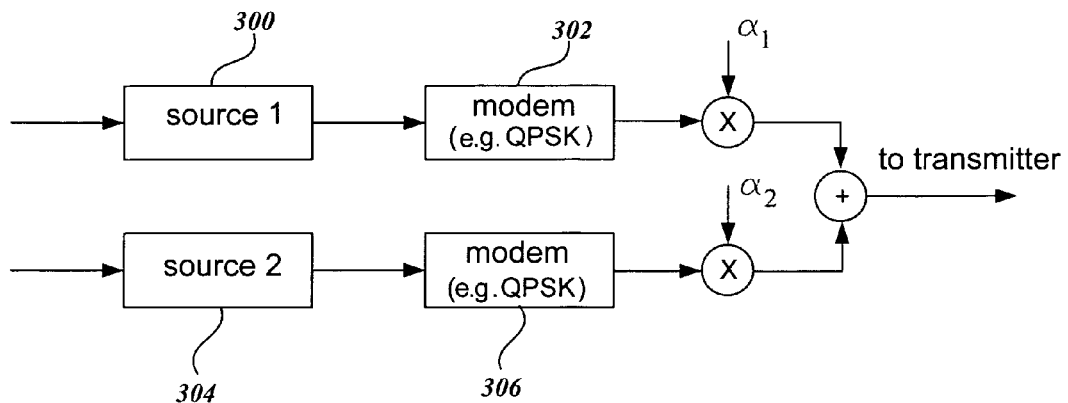
FIG. 7 is a diagram illustrating a prior art method for hierarchical multimedia delivery.

3. Capacity achieving performance—by using DPC at the transmitter, the information theoretic data rate limits can be achieved without receiver complication The prior approach that achieves hierarchical multimedia delivery is illustrated in FIG. 7, where the first data stream (source 1) is coded and modulated (e.g., using QPSK). The power of the first modulated data stream is adjusted by $\alpha_1$. Similarly the second data stream (source 2) is coded and modulated in a separate branch (e.g. using QPSK) with power $\alpha_2$. The two modulated signals are then mixed before being transmitted. Clearly, the two modulated signals interfere to each other, leading to lower performance than regular QAM schemes.

A typical constellation of the hierarchical QAM signal is depicted in FIG. 4A. At the receiver side, a low signal strength user will simply demodulate the basic signal (the first data stream) while users with higher signal strength can demodulate both signals from the constellation.

The present method suggests a different hierarchical modulation approach for broadcasting application using the DPC.

Figure 8:
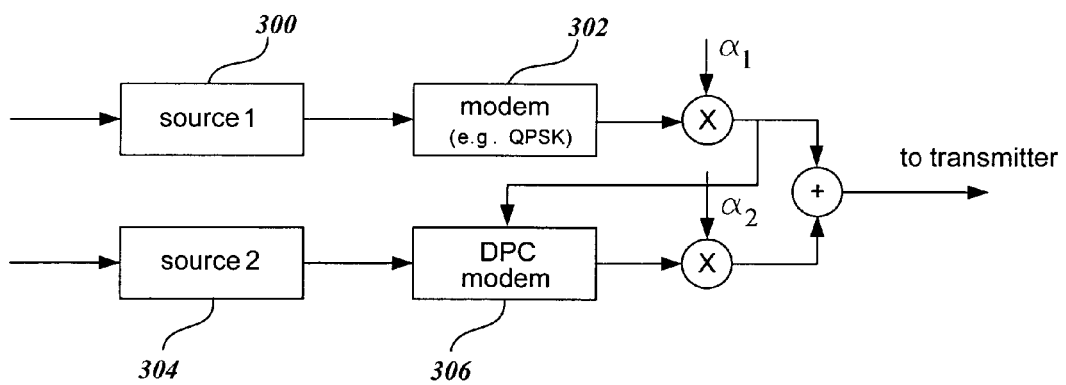
FIG. 8 shows an application of the present method to hierarchical multimedia delivery.

In the present scheme, the first data stream (Source 1) is modulated with regular modem technique such as the QPSK. Instead of generating the second signal independently, the interference from the first data stream is pre-subtracted using the DPC technique as shown in FIG. 8. Because of this operation, the second modulated data stream, when reaching a receiver, will suffer from no interference from source 1, as discussed above.

A number of DPC implementation algorithms can be employed, including the trellis code approach and the structured DPC ("SDPC") method. The SDPC is computational advantageous due to the exploitation of the structure information embedded in the interfering signal.

III. Performance Analysis and Simulation Results

In this section, we analyze the symbol error rate of the proposed scheme and compared it with the regular THP preceding.

3.1 Two Users with QPSK Constellation

Assuming that source and interference are both QPSK signals and the signal strength of interference abides $|v|<|s|\leq 3|v|$. The constellation of y for regular THP and proposed precoding scheme are shown in FIGS. 4A and 4B. In FIG. 4A, the dots inside the dashed are effective constellation points. The symbol error rate for this case is easy to calculate as:

$$P_{THP} = 4 \times P_e/2 = \mathrm{erfc}\left(\sqrt{\frac{E_{b\_THP}}{N_0}}\right)$$

For the proposed scheme, we map the source into the constellation according to the interference by the following rules:

$x=\mathrm{sign}(s)((2v-|v|))-|s|)$

The mapping from source v to y is shown in FIG. 4B. The symbol error rate for this case is:

$$P_{SDPC} = 2 \times P_e/2 = \frac{1}{2}\text{erfc}\left(\sqrt{\frac{E_{b\_SDPC}}{N_0}}\right)$$

In absence of the interference, the symbol error rate for QPSK signal through AWGN channel is $$P_{AWGN} = 2 \times P_e/2 = \text{erfc}\left(\sqrt{\frac{E_{b\_AWGN}}{N_0}}\right).$$

Under the same transmitter power constraint, it is clear that $E_{b\_AWGCN} \leq E_{b\_SDPC} \leq E_{b\_AWGCN}$. So we get $P_{AWGCN} \leq P_{SDPC} \leq P_{THP}$. This equation is also valid when source and interference are both BPSK (binary phase shift keying) signals.

Simulation studies have been conducted. In our simulation, the source and interference are both QPSK signals. The amplitude of interference signal is chosen to be 1.5 times of that of source signal for the proposed scheme. For the regular THP, α is set to be optimized value as $$\frac{P_x}{P_x + P_n}.$$

The simulation results match the theoretical results well in high SNR region.

We also studied the performance of modified THP precoding with channel coding. A rate ½(7, 5) turbo code is used with the log-map decoding algorithm. The results show that the modified scheme outperforms the regular THP and has almost the same performance as the interference-free case.

3.2 Two Users with High Order Constellation

Following the example in last section, we study the case where the source is QPSK and interference is 16-QAM modulated. With the similar analysis as the above, the symbol error rate of regular THP case is:

$$P_{se1} = 2\text{erfc}\left(\sqrt{\frac{E_b}{N_0}}\right).$$

For the new scheme:

$$P_{se2} = \text{erfc}\left(\sqrt{\frac{E_b}{N_0}}\right).$$

In absence of the interference, the symbol error rate for QPSK signal through AWGN channel is $$P_{se3} = 2 \times P_e = \text{erfc}\left(\sqrt{\frac{E_b}{N_0}}\right).$$

So we get $P_{se1} = 2P_{se2} = P_{se3}$.

We also conducted simulation for this case. In our simulation, a is set to be optimized value as $$\frac{P_x}{P_x + P_n}$$

for the regular THP. The simulation results match the theoretical results well in high SNR region.

We also studied the performance of modified THP precoding with channel coding. A rate ½(7, 5) turbo code is used with the log-map decoding algorithm. The results show that the modified scheme outperforms the regular THP and has almost the same performance as the interference-free case.

The present modified precoding approach outperforms the regular THP preceding, especially for BPSK and QPSK signals. The new algorithm achieves comparable performance as the interference-free case. For the high order constellation, the performance improvement is reduced and the system complexity is increased. This precoding method can be extended into multi-user case.

While illustrative embodiments have been illustrated and described, it will be appreciated that various changes can be made therein without departing from the spirit and scope of the invention.

The invention claimed is:

1. A method for generating a precoded signal transmitted from a transmitter to a receiver in a system, the method comprising:
   generating a first source signal representing information to be transmitted from the transmitter to the receiver;
   generating a second source signal representing information to be transmitted from the transmitter to the receiver;
   modulating the first source signal according to a first modulation structure used by the transmitter to generate a first modulated source signal;
   modulating the second source signal according to a second modulation structure used by the transmitter to generate a second modulated source signal;
   transmitting the first and second modulated source signal;
   receiving the first and second modulated source signal at the receiver;
   determining the second modulation structure of a second modulated source signal at the receiver;
   wherein the second modulated source signal being interference to the first modulated source signal;
   determining a constellation for decoding the received first modulated source signal at the receiver, the determined constellation being based on the second modulation structure;
   determining a mapping rule for mapping the second modulated source signal based on the determined constellation; and
   precoding the first modulated source signal according to the mapping rule prior to transmitting the first modulated source signal.

2. The method of claim 1, wherein the first modulated source signal and second modulated source signal are generated using quadrature amplitude modulation.

3. The method of claim 1, wherein at least one of the first modulated source signal and second modulated source signal are generated using a modulation of higher order than quadrature amplitude modulation.

4. The method of claim 1, wherein the first source signal represents a multimedia content and the second modulated source signal represents a high-resolution of the multimedia content.

5. The method of claim 1, wherein the first source signal is QPSK modulated.

6. The method of claim 5, wherein the second modulated source signal is 16-QAM modulated.

7. The method of claim 1, wherein the mapping rule does not include a modulo operation.

8. A method for generating a precoded signal transmitted from a transmitter to a receiver in a system, the method comprising:
- generating a first modulated source signal representing information to be transmitted from the transmitter to the receiver;
- generating a second modulated source signal representing information to be transmitted from the transmitter to the receiver;
- transmitting the first and second modulated source signal;
- receiving the first and second modulated source signal at the receiver;
- identifying an interference signal that is interference to the first modulated source signal;
- determining a modulation structure of the interference signal, wherein the second modulated source signal being interference to the first modulated source signal;
- determining a constellation for decoding the received first modulated source signal at the receiver, the determined constellation being based on the modulation structure of the interference signal;
- selecting a mapping rule according to the determined constellation for directly mapping the first modulated source signal to a precoded signal, wherein the mapping rule does not require a modulo operation; and
- precoding the first modulated source signal for generating the precoded signal according to the mapping rule and the modulation structure of the interference signal.

9. The method of claim 8, wherein the interference signal and the precoded signal are generated by a single transmitter.

10. The method of claim 8, wherein the modulation structure of the interference signal is quadrature amplitude modulation.

11. The method of claim 10, wherein the quadrature amplitude modulation utilizes a rectangular constellation.

12. The method of claim 8, wherein the interference signal and the first modulated source signal are quadrature phase shift keying modulated.

13. The method of claim 8, wherein the first modulated source signal is quadrature phase shift keying modulated and the interference signal is 16-QAM modulated.

14. The method of claim 8, wherein the first modulated source signal represents a low-resolution of a multimedia content, and the interference signal represents a high-resolution of the multimedia content.

15. The method of claim 1, further comprising broadcasting the precoded signal concurrently with the second modulated source signal.

16. The method of claim 8, further comprising broadcasting the precoded signal concurrently with the interference signal.

* * * * *